US009992971B2

(12) United States Patent
McKinnon et al.

(10) Patent No.: US 9,992,971 B2
(45) Date of Patent: Jun. 12, 2018

(54) APPARATUS FOR RECEIVING FOOD PRODUCTS

(71) Applicant: Kinn, Inc., Aliso Viejo, CA (US)

(72) Inventors: Alexander James McKinnon, Aliso Viejo, CA (US); Allen Chandler Young, Encinitas, CA (US)

(73) Assignee: Kinn, Inc., Aliso Viejo, CA (US)

( * ) Notice: Subject to any disclaimer, the term of this patent is extended or adjusted under 35 U.S.C. 154(b) by 105 days.

(21) Appl. No.: 15/092,305

(22) Filed: Apr. 6, 2016

(65) Prior Publication Data

US 2016/0212970 A1 Jul. 28, 2016

Related U.S. Application Data

(63) Continuation of application No. 14/524,616, filed on Oct. 27, 2014.

(60) Provisional application No. 62/028,152, filed on Jul. 23, 2014, provisional application No. 61/949,706, filed on Mar. 7, 2014.

(51) Int. Cl.
*A01K 5/01* (2006.01)

(52) U.S. Cl.
CPC .................. *A01K 5/0128* (2013.01)

(58) Field of Classification Search
CPC .. A01K 5/0121; A01K 5/0142; A01K 5/0128; A01K 5/0135
USPC .................................................. 220/719, 731
See application file for complete search history.

(56) References Cited

U.S. PATENT DOCUMENTS

| 1,583,512 | A | | 5/1926 | Worth |
| 2,802,499 | A | * | 8/1957 | Tupper ................. A47J 43/0727 |
| | | | | 220/731 |
| 3,527,192 | A | | 9/1970 | Ferrara |
| 3,653,362 | A | | 4/1972 | Davis |
| 3,698,594 | A | | 10/1972 | Boehlert |
| 3,810,446 | A | | 5/1974 | Kightlinger et al. |
| 3,991,719 | A | | 11/1976 | Bruce |
| 4,800,845 | A | | 1/1989 | Budd |
| 5,445,110 | A | | 8/1995 | Birnie |
| 5,593,891 | A | * | 1/1997 | Banes .................... C12M 23/10 |
| | | | | 220/731 |
| 5,709,168 | A | | 1/1998 | Walker |
| 5,782,374 | A | | 7/1998 | Walker |
| 5,975,016 | A | | 11/1999 | Wesenhagen |
| 6,032,824 | A | | 3/2000 | Barrow |
| 6,237,532 | B1 | | 5/2001 | Derr |

(Continued)

FOREIGN PATENT DOCUMENTS

| EP | 0873683 A1 * | 10/1998 | ........... A01K 5/0135 |
| WO | 0213601 | 2/2002 | |
| WO | 2012112377 | 8/2012 | |

*Primary Examiner* — Magdalena Topolski
(74) *Attorney, Agent, or Firm* — Umberg Zipser LLP (57) ABSTRACT

An apparatus for receiving a food product having a cover and a removable liner are disclosed. The cover has a top and bottom opening and a sidewall that extends at least partially between the top and bottom opening. At least one aperture is disposed on the sidewall. The removable liner can be inserted within the cover to form the apparatus for receiving the food product. After use of the removable liner, a user can dispose the removable liner by using the aperture to lift the cover with the removable liner inside, and dropping the removable liner into a waste receptacle.

8 Claims, 6 Drawing Sheets

(56) References Cited

U.S. PATENT DOCUMENTS

| | | | |
|---|---|---|---|
| 6,338,421 B1 * | 1/2002 | Rush | B65D 47/06 |
| | | | 220/729 |
| 6,561,375 B1 | 5/2003 | Nagy | |
| 6,644,241 B2 | 11/2003 | Brown | |
| 6,647,741 B2 | 11/2003 | Pechous et al. | |
| 6,840,191 B2 | 1/2005 | Gaspary et al. | |
| 7,204,202 B2 | 4/2007 | Behun et al. | |
| 7,320,292 B1 * | 1/2008 | Ferrantelli | A01K 5/0114 |
| | | | 119/61.56 |
| 7,392,761 B2 | 7/2008 | Kujawa et al. | |
| 7,789,041 B1 | 9/2010 | Taylor | |
| D659,296 S | 5/2012 | Anderson | |
| 8,777,042 B2 | 7/2014 | Matthews et al. | |
| 2006/0027176 A1 | 2/2006 | McQuade et al. | |
| 2007/0261641 A1 | 11/2007 | Manley-Hood | |
| 2008/0017655 A1 | 1/2008 | Martel et al. | |
| 2008/0264345 A1 | 10/2008 | Kujawa et al. | |
| 2011/0147399 A1 | 6/2011 | Salciarini et al. | |
| 2011/0162583 A1 | 7/2011 | Rostamo et al. | |
| 2011/0283946 A1 | 11/2011 | Fairbanks | |
| 2011/0284547 A1 | 11/2011 | McElligott et al. | |
| 2012/0199076 A1 | 8/2012 | Biede et al. | |
| 2012/0210941 A1 | 8/2012 | Brown | |
| 2013/0118412 A1 | 5/2013 | Korrie | |
| 2013/0284102 A1 | 10/2013 | McCune | |
| 2014/0165920 A1 | 6/2014 | Sarty et al. | |
| 2014/0352621 A1 | 12/2014 | Fairbanks | |
| 2015/0173541 A1 * | 6/2015 | Frangione | A47G 19/02 |
| | | | 220/574.1 |

* cited by examiner

APPARATUS FOR RECEIVING FOOD PRODUCTS

This application is a continuation application, and claims priority to, U.S. application Ser. No. 14/524,616, filed on Oct. 27, 2014, which claims priority to U.S. Provisional Application Ser. No. 62/028,152, filed on Jul. 23, 2014, and U.S. Provisional Application Ser. No. 61/949,706, filed on Mar. 7, 2014. All extrinsic materials identified herein are incorporated by reference in their entirety. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is an apparatus for receiving food products.

BACKGROUND

The background description includes information that may be useful in understanding the present invention. It is not an admission that any of the information provided herein is prior art or relevant to the presently claimed invention, or that any publication specifically or implicitly referenced is prior art.

Disposable plates and dishes have been used for some time to conveniently feed guests without the hassle of cleaning dishes afterwards. While this can provide an advantage to those trying to save time, a challenge arises when feeding guests that are incapable of cleaning for themselves or eating properly (e.g., young toddlers and pets). In those situations, disposable plates and dishes can be problematic as they are not useful in preventing a mess and can be easily destroyed.

Traditional pet bowls also have the same problem because pets are not typically trained to eat in a clean and orderly fashion. To help mitigate the problems associated with cleaning, some have contemplated disposable pet dishes and liners. For example, U.S. Pat. No. 4,800,845 to Budd discloses a disposable food dish having a liner and a holder. The holder of Budd has a raised portion that locks into a depression in the liner to attach or detach the liner onto holder. In another example, U.S. Pat. No. 7,204,202 to Behun discloses a pet dish with a disposable liner. In yet another example, U.S. Pat. No. 5,445,110 to Birnie discloses a pet feeding system with disposable inserts that are positioned within a bowl using an adhesive tab. While these references provide a disposable plate or dish that can be used for special cases, it appears that disposing the liner requires a user to unfortunately contact the liner, which can be unsanitary and germ-ridden.

Thus, there is still a need for a safer and cleaner system for pet bowls.

SUMMARY OF THE INVENTION

The inventive subject matter provides apparatus, systems and methods in which a food product or liquid can be received and disposed in a pet bowl in a clean and convenient manner. In one aspect, a bowl or cover is sized and dimensioned to receive a removable and optionally disposable liner for receiving a food product. The cover has top and bottom openings, and a sidewall that extends at least partially between the top and bottom openings. The cover has a first rim that extends inwardly (i.e., towards the center of the cover) from an upper portion of the sidewall to define the top opening. The cover further has an aperture disposed on the sidewall. It should be appreciated that the aperture provides access to the removable liner when received by the cover so that a user can lift both the cover and removable liner such as by inserting a finger into the aperture (i.e., using the aperture to grip and lift the cover and removable liner within the cover). When positioned over a waste disposal, the user can release the liner and retain hold of the cover via the aperture to dispose of the liner into the waste disposal in a quick, clean and convenient manner.

It is contemplated that the cover can include various other features. For example, the cover can have a bottom opening that has a larger inner diameter than the top opening, such that the liner is preferably inserted within the cover through the bottom opening and is prevented from being inserted or removed through the top opening. In another example, the cover can have a fastener that is configured to engage the removable liner. In yet another example, a protrusion can extend from the first rim that is sized and dimensioned to engage a hole on the removable liner to thereby limitation rotation of the liner with respect to the cover.

In another aspect, the inventive subject matter provides an apparatus for receiving a food product or liquid. The apparatus comprises a cover and a removable bowl. The cover has top and bottom openings, and a sidewall having an aperture and extending at least partially between the top and bottom openings. The top opening is defined by a rim that extends inwardly (i.e., towards the center) from the sidewall. The removable bowl is sized and dimensioned to pass through the bottom opening of the cover. Furthermore, the removable bowl has a lip that defines a top opening, and an outer diameter of the bowl is greater than an inner diameter of the rim. Thus, the cover is sized to overlay the removable bowl, such that the removable bowl can pass through the bottom opening, but not the top opening of the cover.

It is contemplated that various features can be added to the apparatus. For example, the removable bowl can have at least one raised area or a divider to reduce an internal volume of the bowl. In another example, a lid having a hole can be added that is rotatably coupled to the cover. Using an actuator coupled to the lid, the lid can rotate on the cover to allow access to a portion food within the bowl via the hole on the lid.

In yet another aspect, a method to refill a removable liner that couples to a cover is contemplated. It should be appreciated that the cover and the removable liner couple to form an apparatus for food product. The method includes a step of providing a plurality of removable liners, each of which is sized and dimensioned to couple the cover. Each of the removable liners comprises a lip that defines a top opening in the removable bowl. The cover has (i) top and bottom openings, (ii) a sidewall having an aperture and that extends at least partially between the top and bottom openings, and (iii) a rim that extends inwardly from the sidewall to define the top opening, such that the removable liner is sized and dimensioned to pass through the bottom opening of the cover. In another step, a user is instructed to refill one removable liner of the plurality of removable liners by (i) lifting the one removable liner when coupled to the cover using the aperture, (ii) disposing the one removable liner by releasing the coupling between the cover and the one removable liner, and (iii) coupling another removable liner of the plurality of removable liners to the cover.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter described herein comprises an apparatus for receiving a food product having a cover and a removable and optionally disposable bowl or liner. As defined herein, a "food product" includes solid, semi-solid and liquid consumables. As used herein, "removable bowl" or "removable liner" includes disposable bowls and non-disposable bowls made of metal, plastic, or any other commercially suitable material that can hold a food product. The cover is sized and dimensioned to receive the removable bowl to form the apparatus for receiving the food product. The cover has a sidewall with an aperture. Using the aperture, a user can lift the cover and the removable bowl therein, and release the removable bowl while holding the cover via the aperture to dispose of the bowl. Thus, a cleaner and more efficient manner of discarding the bowl is provided.

Figure 1:
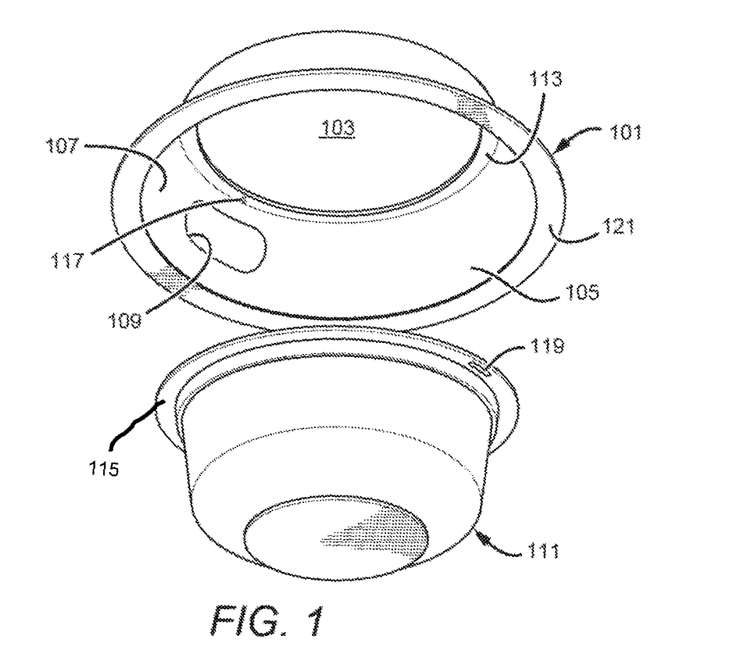
FIG. 1 is a bottom perspective view of an embodiment of an apparatus for receiving a food product having a cover and a removable liner.

In one aspect, a cover 101 is sized and dimensioned to receive a removable liner as shown in FIG. 1. The cover 101 has a top opening 103 and a bottom opening 105. Cover 101 also has a sidewall 107 that extends between top opening 103 and bottom opening 105. Sidewall 107 further has an aperture 109 that extends through sidewall 107. It is contemplated that aperture 109 allows access to a removable liner 111 when removable liner 111 is received by cover 101. Cover 101 also has a first rim 113 that extends from an upper portion of the sidewall, and first rim 113 extends inwardly from sidewall 107 to define top opening 103. Although a single aperture is shown, cover 101 could have a two or more apertures.

Cover 101 can be made of various materials, sizes, and shapes. For example, as shown in FIG. 1, cover 101 can be a metal of cylindrical shape and sized to receive removable liner 111. However, cover 101 can be a plastic, a ceramic or other suitable material, and can be a square, triangle or other shape so long as it is sized to receive a corresponding removable liner.

Cover 101 has a sidewall 107. It is contemplated that sidewall 107 has a lower portion that defines bottom opening 105. Additionally, sidewall 107 extends between top opening 103 and bottom opening 105. As shown in FIG. 1, sidewall 107 extends in an outward slant (i.e., flared away from the center of cover 101) starting from top opening 103 and extending outwardly to bottom opening 105. Thus, it is contemplated that bottom opening 105 has a larger inner diameter than the top opening 103.

While FIG. 1 shows sidewall extending from top opening 103 to bottom opening 105, it is contemplated that an intervening piece, such as a wall having a different slope could separate the sidewall 107 from at least one of the top opening 103 and bottom opening 105. Furthermore, it is contemplated that the sidewall 107 could extend beyond at least one of top opening 103 and bottom opening 105 (i.e., sidewall extends beyond run or other structural feature that defines opening).

Sidewall 107 further comprises aperture 109. In some contemplated embodiments, cover 101 could have an aperture 109 with an area of at least 1.5 square inches, and preferably between 2-3 square inches, although any commercially suitable sized aperture could be used such that the cover and liner could be lifted simultaneously by a user. It should be appreciated that aperture 109 can function as a finger or hand port to allow a user to lift cover 101 and removable liner 111 simultaneously. This is especially critical where cover 101 and removable liner 111 are not securely locked together, or lack a mechanism to lock the two pieces, as the user would otherwise be prevented from lifting the removable bowl with the cover piece direct from the ground or other surface. However, even with a locking mechanism, aperture allows for quick release of the removable liner 111 from the cover 101.

Cover 101 can further have a protrusion 117 extending from first rim 113. Protrusion 117 is preferably sized and dimensioned to engage a hole 119 on removable liner 111. Although protrusion 117 is extending from rim 113, it is contemplated that protrusion 117 can extend from sidewall 107 or another region of cover 101. In other contemplated embodiments, protrusion 117 can extend from removable liner 111 into hole 119 that can be on cover 101. It should be appreciated that protrusion 117 can match hole 119 on removable liner 111 to limit rotation of removable liner 111.

Figure 2:
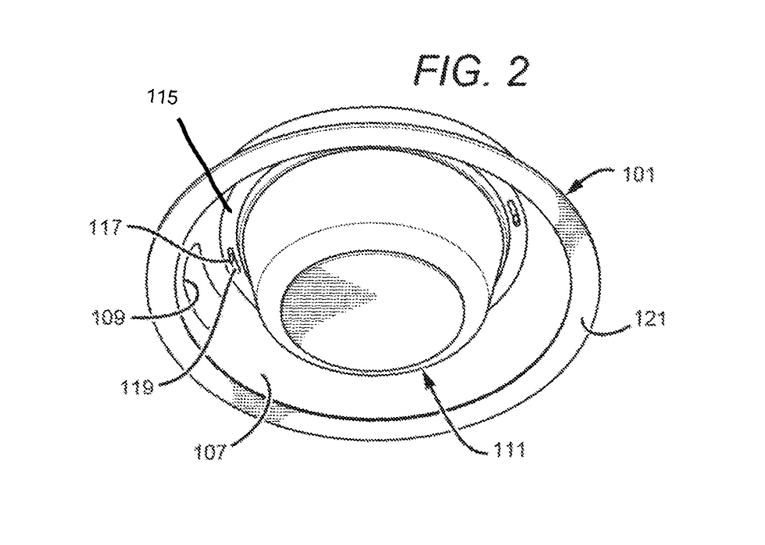
FIG. 2 is a bottom perspective view of the apparatus in FIG. 1 when cover receives the removable liner.

FIG. 2 shows cover 101 and removable liner 111 in an engaged position where protrusion 117 is engaged with hole 119 of removable liner 111. In this manner, hole 119 in removable liner 111 acts to limit rotation of the removable liner 111 relative to cover 101. It is contemplated that removable liner 111 can have more two or more holes, which are sized and dimensioned to receive different projections of cover 101. One should appreciate that different methods of limiting rotation of cover 101 and removable liner 111 can be implemented besides the protrusion and hole assembly in FIG. 2. For example, hole 119 can have a tapered width so that a user can direct protrusion 117 through hole 119 and rotate one of removable liner 111 or cover 101 until protrusion 117 and hole 119 lock due to the tight fit between the widths of each piece. In other contemplated embodiments, lip 115 of the removable liner 111 can mate with, and can screw into, cover 101 with minimal effort to allow a user to insert or remove the removable liner 111 with the twist of one hand, e.g. similar to how a Braun™ refill brush-head attaches to an electric toothbrush.

Cover 101 can further include a second rim 121 that extends outwardly (i.e., away from the center) from a bottom portion of the sidewall. By having second rim 121 for cover 101, the base of cover 101 is enhanced. In contemplated embodiments, second rim 121 can have a frictional pad to prevent cover 101 from skidding or moving while placed on a floor. For example, second rim 121 can have a rubber or silicon material to increase the friction of cover 101 against a resting surface and thereby inhibit movement of the support piece as a pet is eating foods from the removable bowl.

Removable liner 111 can be a removable bowl that is sized and dimensioned to receive a food product. Suitable food products include solid, semi-solid, and liquid products. Moreover, removable liner 111 can be formed from paper, fibrous material, metal, or any other commercially suitable material, which may or may not comprises or contain a biodegradable material. As used herein, a "biodegradable material" means a material that will break down to at least 90% $H_2O$, $CO_2$, and biomass within a period of six months from the action of naturally occurring micro-organisms such as bacteria, fungi, algae etc. under favorable conditions. As used herein, "fibrous material" means materials characterized by a plurality of discrete fibers. The filaments can be plant or animal derived, synthetic, or some combination of these.

Figures 3A, 3B:
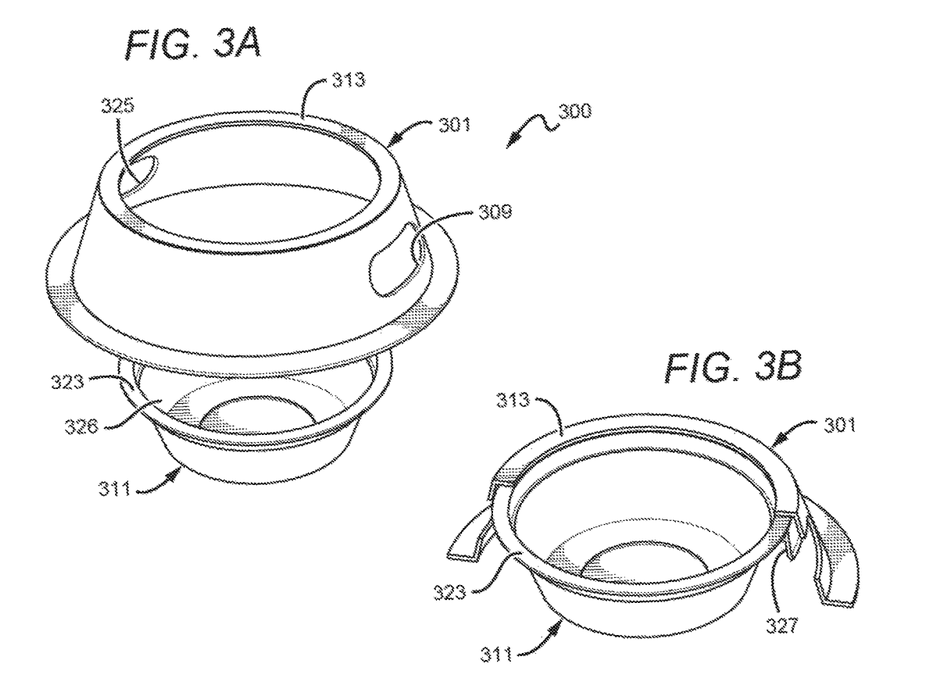
FIGS. 3A-3C are perspective views of an embodiment of an apparatus for receiving a food product having a fastener that couples a cover with a removable bowl.
Figure 3C:
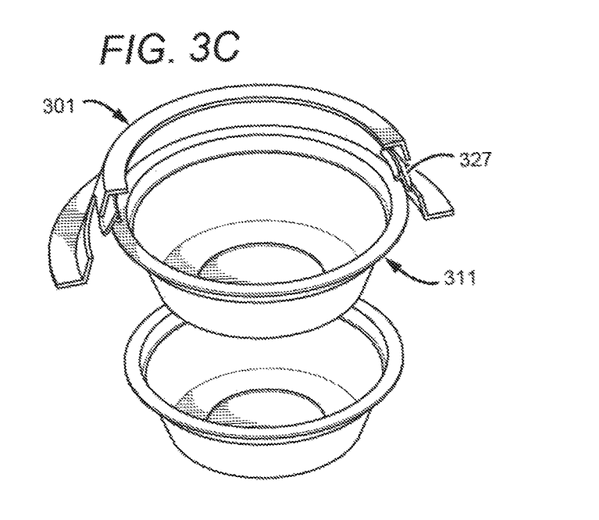

In another aspect, the inventors contemplate an apparatus for receiving a food product. FIGS. 3A-3C show an apparatus 300 for receiving a food product. Apparatus 300 has a cover 301 and a removable bowl 311. Similar to the cover described above, cover 301 has a top and bottom openings, and a sidewall having a first aperture 309 and extending between the top and bottom openings. Removable bowl 311 has a lip 323 that defines a top opening 326 in removable bowl 311. The outer diameter of removable bowl 311 is greater than the inner diameter of rim 313, such that removable bowl 311 can pass through the bottom opening, but not the top opening of cover 301. For example, rim 313 can be sized and dimensioned to cover lip 323 of removable bowl 311 when cover 301 is disposed over removable bowl 311 as shown in FIG. 3B. It should be noted that features similar to those described above are incorporated herein.

Aperture 309 is sized and dimensioned to allow access to removable bowl 311 while cover 301 is disposed over removable bowl 311 as shown in FIG. 3B. By providing a first aperture 309, a user can simultaneously lift the removable bowl and cover piece. It is contemplated that cover 301 can have a second aperture 325 disposed on the sidewall as shown in FIG. 3A. First aperture 309 and second aperture 325 can be sized and dimensioned to allow access to removable bowl 311 while cover 301 is disposed over removable bowl 311. Therefore, two access points can be provided for a user to lift cover 301 and removable bowl 311 simultaneously. Thus, cover 301 and removable bowl 311 can be lifted simultaneously from the ground, for example, when a pet is finished eating. Removable bowl 311 can then be thrown away by a user simply by at least partially removing the user's finger from first aperture 309 and/or second aperture 325, which allows the removable bowl 311 to drop from cover 301 and into a trash can or other receptacle, for example.

Apparatus 300 can further include a fastener 327 located on cover 301 to removably engage removable bowl 311. It is contemplated that fastener 327 couples removable bowl 311 with cover 301, whereby removable bowl 311 clicks in and out of cover 301 so that a user is not required to touch removable bowl 311 and thereby helps prevent a user from getting his or her hands soiled from any remnant pet food/water. Preferably, lip 323 of removable bowl 311 snaps into fastener 327 which then holds removable bowl 311 in place until released by a user. In this manner, removable bowl 311 can be disposed of in a garbage can, for example, without requiring the user to touch the bowl itself, only cover 301. Using first aperture 309 and/or second aperture 325 on a sidewall of cover 301, the user can simply lift removable bowl 311 and cover 301, and then release removable bowl 311 when desired.

Figure 4A:
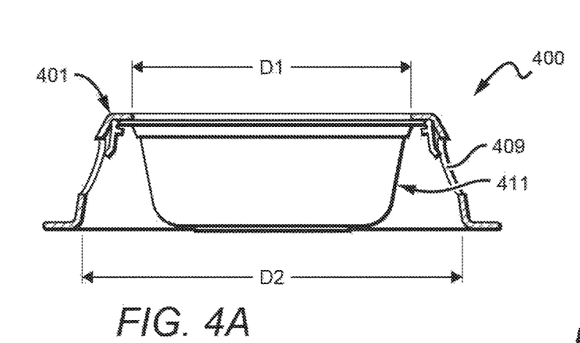
FIGS. 4A-4C are side views of an embodiment of an apparatus for receiving a food product showing the various diameters of a cover and a removable bowl.
Figure 4B:
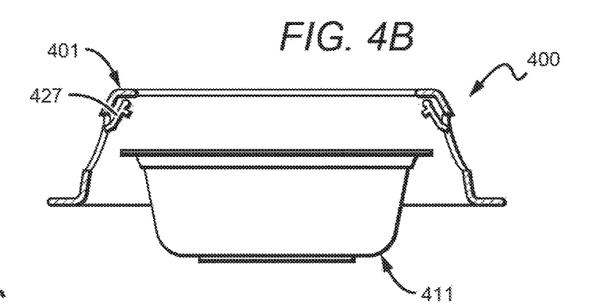
Figure 4C:
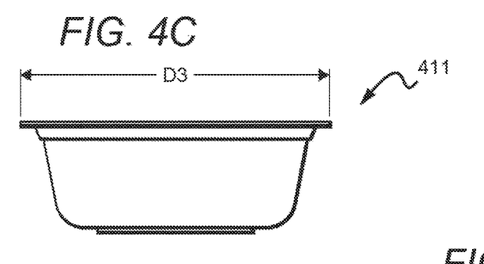

FIGS. 4A-4C show an apparatus for receiving food similar to those described above. Similar features described above are incorporated herein. The cover 401 preferably has two openings, one on each of its top and bottom surfaces, and an aperture 409 on a sidewall. It is especially preferred that the top opening has an inner diameter (D1) that is preferably smaller than an inner diameter (D2) of the bottom opening of the cover 401, and that the inner diameter (D1) of the top opening is smaller than an outer diameter (D3) of the removable bowl's lip, such that the removable bowl 411 is prevented from passing through the top opening. By having bottom opening of cover 401 through which removable bowl 411 can be inserted and removed, removable bowl 411 can quickly and easily be inserted or removed without first requiring removal of a separate bottom piece or cover. Moreover, a fastener 427 can be used to remove removable bowl 411 so that user does not have to contact removable bowl 411.

Figure 5:
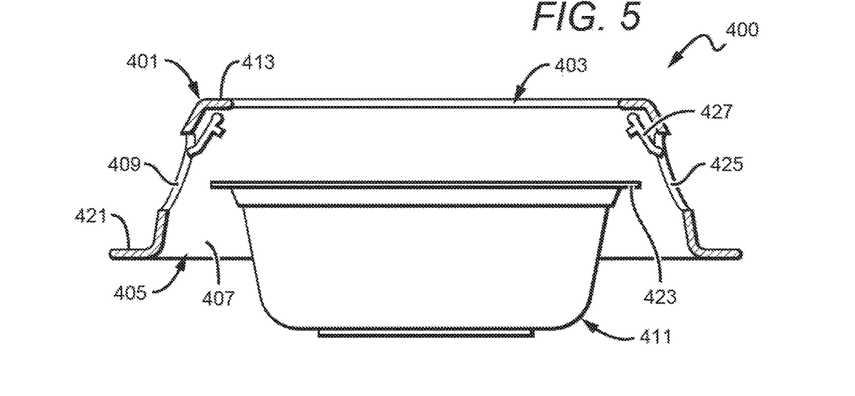
FIG. 5 is a side view of the apparatus in FIGS. 4A-4C in a decoupled position.
Figure 6:
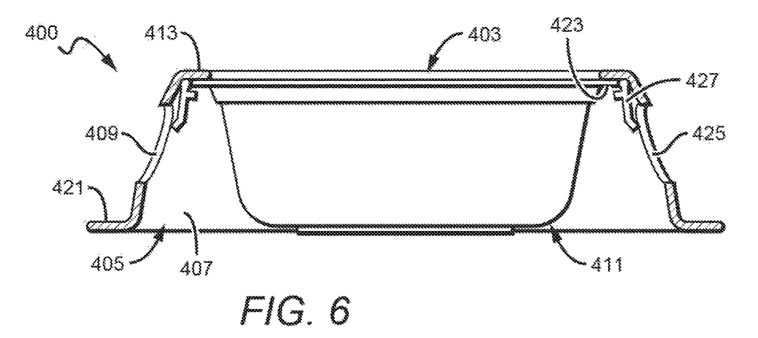
FIG. 6 is a side view of the apparatus in FIGS. 4A-4C in a coupled position.

FIGS. 5 and 6 show an enlarged view of the apparatus in FIG. 4. Removable bowl 411 having lip 423 is partially inside cover 401. A user can couple removable bowl 411 to cover 401 using fastener 427 as shown in FIG. 6. Once coupled, a user can use at least one of aperture 409 and second aperture 425 to pick up or move cover 401 and removable bowl 411 simultaneously. In contemplated embodiments, top opening 403 and bottom openings 405 are concentric about an axis (e.g., center axis of cover 401), and aperture 409 has a center axis that is substantially perpendicular to the axis (e.g., center axis of cover 401). To release removable bowl 411, a user can simply push a lever of fastener 427 to decouple the removable bowl 411 from cover 401. In other embodiments, there is no fastener 427 and a user can lift cover 401 and removable bowl 411 using at least one of aperture 409 and second aperture 425 and by placing a finger under lip 423 of removable bowl 411. Once a user is ready to remove removable bowl 411, the user can remove his or her finger from beneath lip 423 to dispose of removable bowl 411, and cover 401 remains in the hand of the user by holding at least one of aperture 409 and second aperture 425.

Figure 7:
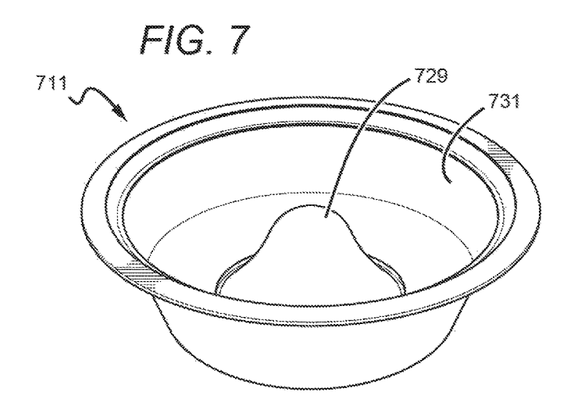
FIG. 7 is a perspective view of an embodiment of removable bowl having a raised area.

FIG. 7 shows an embodiment of a removable bowl 711 having a raised area 729. It should be appreciated that raised area 729 is sized and dimensioned to effectively reduce an internal volume of removable bowl 711. Raised area 729 can also help control the pace at which a pet is able to eat, i.e., a "slow-food' in removable bowl 711. Removable bowl 711 has a cavity 731 for receiving a food product (e.g., pet food or human food). It is contemplated that removable bowl 711 can have more than one raised area to further reduce the internal volume of removable bowl 711 or form a plurality of grooves into which food or liquid could be placed. Moreover, raised area 729 can have various shapes and sizes depending on the size of the animal and the type of food to be placed in the removable bowl. Raised area 729 could have any commercially suitable shape, but are preferably rounded to reduce potential irritation of a pet's tongue.

Figure 8:
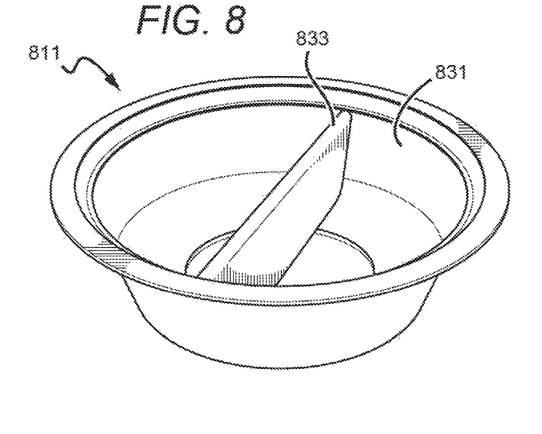
FIG. 8 is a perspective view of an embodiment of removable bowl having a divider.

FIG. 8 shows an embodiment of a removable bowl 811 having a divider 833 sized and dimensioned to divide an internal volume of removable bowl 811 into at least two sections (e.g., one for food and one for water or milk). A user can then use one section for one food product and the second section for another food product. Similar to the embodiment of removable bowl of FIG. 7, removable bowl 811 can have a cavity 831 that receives a food product. It is contemplated that removable bowl 811 has more than one divider to create additional sections. In addition to creating multiple interior sections, it is contemplated that divider 833 could alternatively or additionally act to reduce the pace at which a pet is able to eat. Divider 833 can be various shapes and sizes to effectively divide removable bowl 811.

Figures 9, 10:
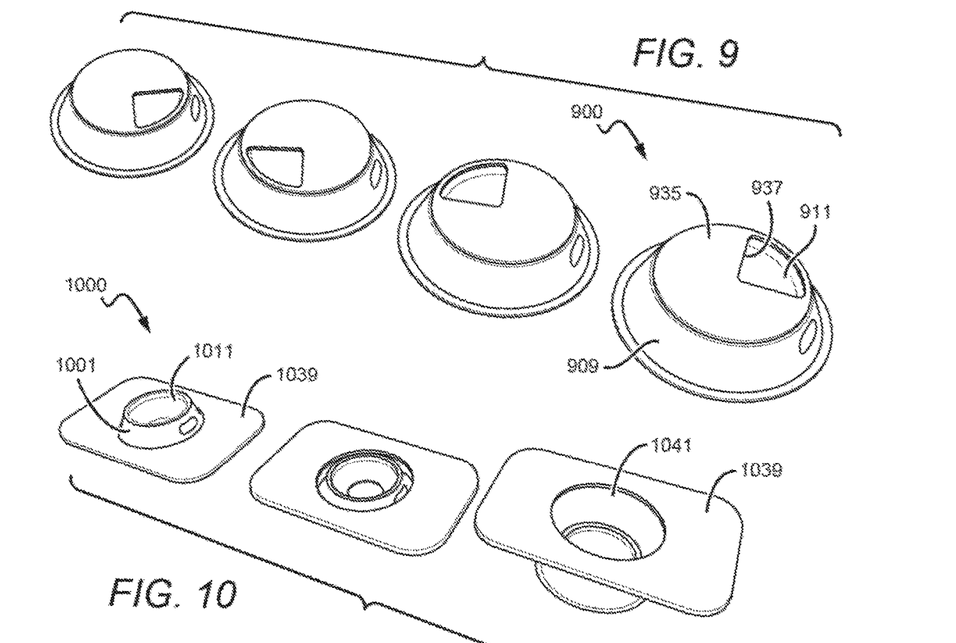
FIG. 9 is a perspective view of an embodiment of an apparatus for receiving food having a rotatable lid.
FIG. 10 is a perspective view of an embodiment of an apparatus for receiving food that includes a mat.

The apparatus for receiving food can also include a lid to partially cover a portion of the food within the removable bowl. For example, FIG. 9 shows an embodiment of an apparatus 900 for receiving a food product. Apparatus 900 comprises a cover 909, removable bowl 911, and a lid 935. Lid 935 has an opening 937 and is preferably rotatably coupled to cover 909. Opening 937 allows access to at least a portion of removable bowl 911 when cover 909 is disposed over removable bowl 911. In this manner, the amount of food exposed to a pet can be controlled over a given time period. A user can manually turn lid 935 to another position to expose more food or a different food product within removable bowl 911.

In another embodiment, an actuator can be coupled to lid 935, such that the actuator rotates lid 935. Actuator can be coupled to a controller that can be programmed to make the actuator rotate lid 935 after a certain time period. It is contemplated that various types of removable bowls can be used with lid 935. For example, a removable bowl having a divider (see FIG. 9) can be used where opening 937 is allowing access to one section of the removable bowl, but blocking another section. After a given time period, the actuator will rotate lid 935 to allow access to the other section. Therefore, lid 935 for could be rotated manually or automatically by a timer such that opening 937 in lid 935 rotates to expose food or water as an automatic feeder to care for pets over multiple days when their owners are away, for example. This is especially useful where the bowl has multiple compartments, which each could store a daily ration for the pet.

Along the same lines, it is contemplated that the removable bowl can include an automatic water fountain. In some embodiments, the removable bowl or cover can be fluidly coupled to a water source wherein a valve inside the coupling is controlled by the controller. Controller can open and close the valve at certain time intervals to pour water into the removable bowl. Additionally, a sensor can be used to sense the water level in the removable bowl. If the water level is sensed to be less than a predetermined threshold, the controller opens the valve to introduce more water into the removable bowl.

The apparatus for receiving food can also include a mat to catch any spills from the removable bowl, as well as a place on which the pet can place their front paws which will keep the removable bowl and its cover from either sliding or being turned over. FIG. 10 shows apparatus 1000 for receiving food having a cover 1001, a removable bowl 1011, and a mat 1039. Mat 1039 comprises a hole 1041 that is sized and dimensioned to receive cover 1001. It is contemplated that mat 1039 can be made of silicon, rubber or some other soft material.

Figure 11:
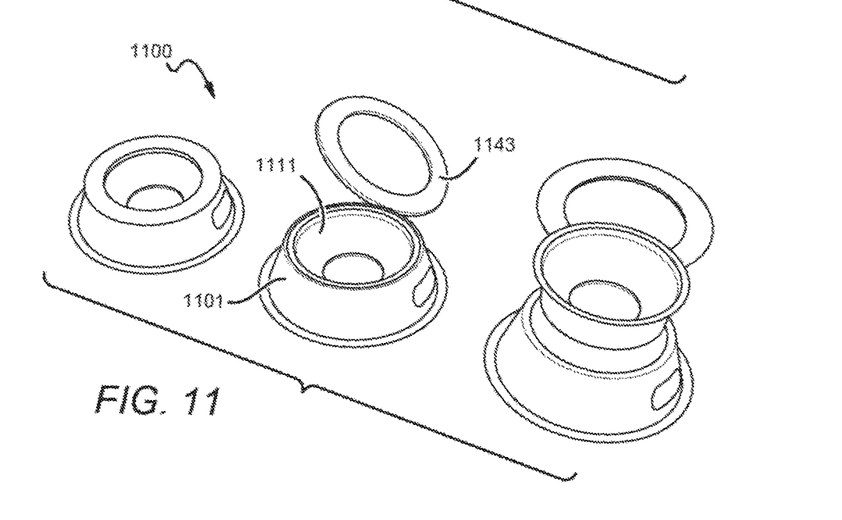
FIG. 11 is a perspective view of an embodiment of an apparatus for receiving food that has a guard.

FIG. 11 illustrates another embodiment of an apparatus 1100 for receiving food. After placing a removable bowl 1111 in a cover 1101 from above, a circular guard 1143 can be used to cover the top of removable bowl 1111 and keep removable bowl 1111 in place by securing the guard 1143 to cover 1101. This helps prevent the pet from accessing removable bowl 1111 and allows removable bowl 1111 to remain self-contained. Of course, the specific shape of the rim could vary to match a shape of the bowl's or cover's perimeter.

Figure 12:
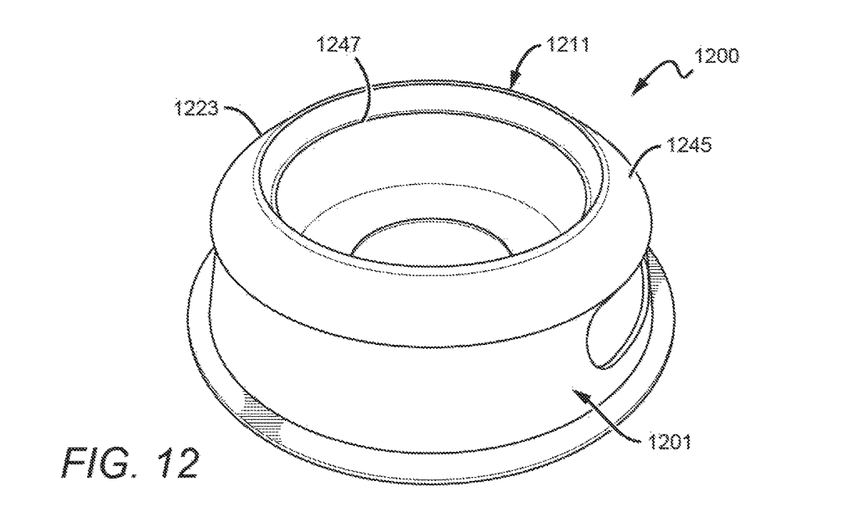
FIG. 12 is a perspective view of an embodiment of an apparatus for receiving food that has a splash and spill guard.

FIG. 12 illustrates yet another embodiment of an apparatus 1200 for receiving food. A removable bowl 1211 with a splash & spill guard where a lip 1223 of removable bowl 1211 not only has an outward protrusion as a place to grip removable bowl 1211 when picking up the bowl, but also an inward protrusion 1247 enough so that it is more difficult for a user or pet to spill or splash food or water from the edges of the removable bowl. In other embodiments, the top of removable bowl 1211 could have an inward protrusion 1247 to reduce an inner diameter of the mouth of the bowl and thereby help prevent the contents of the removable bowl from spilling or splashing.

It should be appreciated that the embodiments disclosed herein are more convenient to use than prior art devices because users are not required to remove a separate bottom piece that prior art devices include to hold the removable bowl or liner in place within the cover, instead, the user may use one hand to pick up the removable bowl and cover and dispose of the removable bowl. In addition, such embodiments provide additional flexibility when compared with prior art devices, because it allows users to dispose of the removable bowl or liner either by simply lifting up the cover and then tossing the removable bowl, or lifting up the cover and removable bowl together and then dropping the removable bowl into a waste receptacle, for example.

Finally, such embodiments disclosed herein also reduce potential spills and other messes that may occur with prior art devices such as those offering top-loading removable bowl holders (i.e., where the removable bowl is simply inserted into a cavity of a holder via a top surface of the holder). By placing the removable bowl beneath the rim of the cover, the rim of the removable bowl is out of reach of the pet, which helps to prevent the pet from eating or tearing the removable bowl and thereby reducing the likelihood of spills from the removable bowl.

Alternatively or additionally, it is contemplated that the removable bowl could be rotated and thereby locked in position relative to the support piece, and rotated the opposite direction to release the removable bowl from the support piece.

Figure 13:
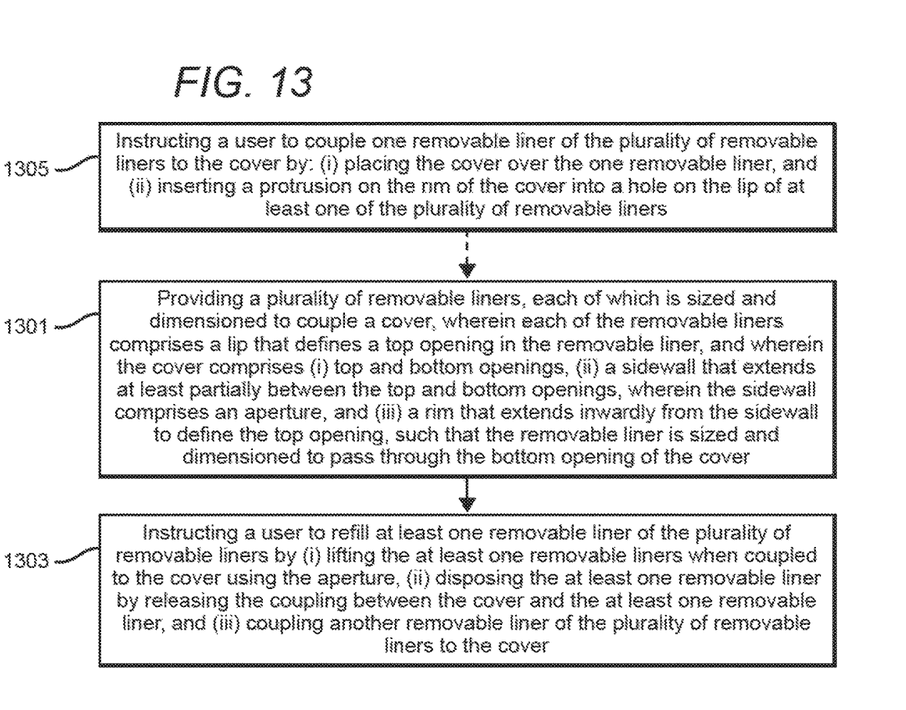
FIG. 13 is a schematic of a method for refilling a removable liner.

In another aspect, a method of refilling a removable liner that couples a cover to form an apparatus for a food product is contemplated as shown in FIG. 13. In one embodiment, step 1301 comprises providing a plurality of removable liners, each of which is sized and dimensioned to couple the cover. The removable liners have a lip that defines a top opening in the removable howl. The cover has (i) top and bottom openings, (ii) a sidewall that extends at least partially between the top and bottom openings, wherein the sidewall comprises an aperture, and (iii) a rim that extends inwardly from the sidewall to define the top opening. It should be appreciated that the removable liner is sized and dimensioned to pass through the bottom opening of the cover.

Step 1303 comprises instructing a user to refill one removable liner of the plurality of removable liners by (i) lifting, the one removable liner when coupled to the cover using the aperture, (ii) disposing the one removable liner by releasing the coupling between the cover and the one removable liner, and (iii) coupling another removable liner of the plurality of removable liners to the cover.

Additionally, the method of refilling a removable liner can also include step 1305, which comprises instructing a user to couple the one removable liner of the plurality of removable liners to the cover by: (i) placing the cover over the one removable liner, and (ii) inserting a protrusion on the rim of the cover into a hole on the lip of at least one of the plurality of removable liners.

In another aspect, the cover can engage a traditional pet bowl made of plastic, ceramic, stainless steel or any other commercially suitable material. One common problem with traditional pet bowls is that pets flip the howls over and create a mess. To address this problem, it is contemplated that cover can engage a traditional pet bowl to prevent the pet bowl from flipping over. In one embodiment, the cover can be composed of a heavy material. Once the cover engages the pet bowl, a pet is unable to flip the pet bowl due to the weight of the cover. In another embodiment, the cover can also include anti-friction surfaces to prevent the pet bowl from skidding and flipping over.

In yet another aspect, the inventor contemplates a method of feeding a pet utilizing an embodiment of the inventive subject matter discussed herein, in one contemplated embodiment, a user can insert a removable bowl through an aperture in a bottom surface of the cover, which can optionally be engaged with the cover via a connecting system. The cover and removable bowl can then be placed on the ground or other surface in reach of a pet. Once the pet is finished eating, the user can lift the removable bowl and cover simultaneously, by inserting a finger into an aperture in the sidewall of the support piece. In some cases, the user may insert one or more fingers into an aperture on each side of the support piece. The removable bowl can then be released from the support piece by either releasing the bowl from the connecting system, if any, and/or removing the user's fingers at least slightly to release support for the bowl from below.

It should be appreciated that the apparatus for receiving as food product disclosed herein provide numerous benefits. For example, pets can receive food/water that smell and taste better because a new germ-free removable bowl is used after each use. In another example, pet owners can save time, water and electricity by not having to clean traditional pet bowls. In addition, pet owners can save money by spending fewer trips to the veterinarian because removable bowls can be disposed after each use, which provides a germ-free environment. Finally, in another example, pet boarding businesses will save costs by eliminating the employee time spent on washing traditional pet bowls, improving customer service by diverting resources to customer-facing activities, and enhancing animal health by using germ-free bowls.

Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified this fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit, of the appended claims.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C, . . . and N, the text should be interpreted as requiring only one element from the group, not A plus N, or B plus N, etc.

What is claimed is:

1. A method of refilling a removable liner on a cover of a food product apparatus, comprising:
    providing a plurality of removable liners, wherein each of the plurality of removable liners comprises a sidewall that defines a top opening and a lip that projects outwardly from a top surface of the sidewall, and wherein the cover comprises (i) a top opening and a bottom opening, (ii) a sidewall that extends outwardly from a top surface of the cover to the bottom opening, (iii) an aperture disposed on the sidewall of the cover, and (iv) a horizontal rim consisting of a planar surface that extends inwardly from the top surface of the cover to define the top opening of the cover; and
    instructing a user to remove a first removable liner of the plurality of removable liners from the cover by simultaneously lifting the cover and the first removable liner, and releasing the first removable liner through the bottom opening of the cover to thereby dispose of the first removable liner; and
    instructing the user to replace the first removable liner with a second removable liner of the plurality of removable liners by placing the second removable liner underneath the cover through the bottom opening of the cover such that the lip of the second removable liner abuts the rim of the cover.

2. The method of claim 1, wherein the instructing the user to remove the first removable liner further comprises using the aperture to simultaneously lift the cover and the first removable liner.

3. The method of claim 2, wherein the instructing the user to remove the first removable liner further comprises the first removable liner while using the aperture to hold the cover.

4. The method of claim 3, wherein the instructing the user to remove the first removable liner further comprises instructing the user to insert a finger through the aperture to lift the cover and the first removable liner, and at least partially removing the finger from the aperture to release the first removable liner.

5. The method of claim 1, wherein the cover further comprises a second aperture disposed on the sidewall.

6. The method of claim 5, wherein the cover comprises the second aperture, and wherein the instructing the user to remove the first removable liner further comprises using the aperture and the second aperture to simultaneously lift the cover and first removable liner.

7. The method of claim 1, wherein the cover further comprises a fastener having a lever, wherein the fastener is configured to couple the first removable liner, and wherein actuation of the lever decouples the first removable liner from the cover.

8. The method of claim 1, where each liner of the plurality of removable liners further comprises an outer diameter that is greater than an inner diameter of the rim of the cover.

* * * * *